(12) United States Patent
Okumura

(10) Patent No.: US 9,756,244 B2
(45) Date of Patent: Sep. 5, 2017

(54) PANORAMIC-IMAGING DIGITAL CAMERA, AND PANORAMIC IMAGING SYSTEM

(71) Applicant: ENTANIYA CO.,LTD, Tokyo (JP)

(72) Inventor: Masaki Okumura, Tokyo (JP)

(73) Assignee: ENTANIYA CO., LTD., Tokyo (JP)

( * ) Notice: Subject to any disclaimer, the term of this patent is extended or adjusted under 35 U.S.C. 154(b) by 187 days.

(21) Appl. No.: 14/764,785

(22) PCT Filed: Mar. 17, 2014

(86) PCT No.: PCT/JP2014/057062
§ 371 (c)(1),
(2) Date: Dec. 7, 2015

(87) PCT Pub. No.: WO2014/156747
PCT Pub. Date: Oct. 2, 2014

(65) Prior Publication Data
US 2016/0150156 A1  May 26, 2016

(30) Foreign Application Priority Data
Mar. 26, 2013  (JP) .................................. 2013-065199

(51) Int. Cl.
*H04N 7/00* (2011.01)
*H04N 5/77* (2006.01)
(Continued)

(52) U.S. Cl.
CPC ......... *H04N 5/23238* (2013.01); *G03B 15/00* (2013.01); *G03B 17/561* (2013.01);
(Continued)

(58) Field of Classification Search
None
See application file for complete search history.

(56) References Cited

U.S. PATENT DOCUMENTS

2012/0033960 A1* 2/2012 Hashimoto .......... F16M 11/046
                                                             396/428
2013/0044258 A1* 2/2013 Dennis .................. G06T 3/0012
                                                             348/445
(Continued)

FOREIGN PATENT DOCUMENTS

JP          2-150495 U     12/1990
JP          5-188506 A      7/1993
(Continued)

*Primary Examiner* — Hung Dang
(74) *Attorney, Agent, or Firm* — Muncy, Geissler, Olds & Lowe, P.C.

(57) ABSTRACT

A panoramic photography digital camera for easily photographing a plurality of images having different orientations without any vignetting in order to generate a panoramic image and to provide a photography system using the panoramic photography digital camera are provided. A panoramic photography digital camera includes: a wide-angle lens having an angle of view at least larger than 180 degrees; a camera body disposed closer to a rear side than the wide-angle lens and positioned at a position that does not fall within the angle of view; a digital imaging element included in the camera body; an image processor that processes image data obtained by the digital imaging element and outputs or stores the image data in a predetermined image format; a level for checking the level of the camera body; and a first connector for connection to a legged platform used when mounting the camera during photographing. A nodal point of the wide-angle lens is positioned on the center of rotation during photographing of panoramic images, and the level provided on an upper surface of the camera body and the first connector provided on a lower surface of the camera body are disposed so as to be positioned on the same line that passes through the center of rotation when seen from above.

10 Claims, 13 Drawing Sheets

(51) Int. Cl.
*H04N 5/232* (2006.01)
*G03B 15/00* (2006.01)
*G03B 37/00* (2006.01)
*G03B 17/56* (2006.01)
*H04N 5/225* (2006.01)

(52) U.S. Cl.
CPC ........... *G03B 37/00* (2013.01); *H04N 5/2251* (2013.01); *H04N 5/2253* (2013.01); *H04N 5/23293* (2013.01)

(56) References Cited

U.S. PATENT DOCUMENTS

2013/0287304 A1* 10/2013 Kimura ................. G06T 7/0028
  382/199
2016/0286119 A1* 9/2016 Rondinelli ............. G03B 17/12

FOREIGN PATENT DOCUMENTS

| JP | 9-5853 A | 1/1997 |
| JP | 2003-308539 A | 10/2003 |
| JP | 2004-126303 A | 4/2004 |
| JP | 2005-86279 A | 3/2005 |
| JP | 2006-178097 A | 7/2006 |
| JP | 2006-295329 A | 10/2006 |
| JP | 2008-177643 A | 7/2008 |

* cited by examiner

PANORAMIC-IMAGING DIGITAL CAMERA, AND PANORAMIC IMAGING SYSTEM

TECHNICAL FIELD

The present invention relates to a digital camera for photographing a plurality of images used for generating a panoramic image and a photography system thereof, and more particularly, to a technique for easily realizing high-quality photographing while preventing vignetting during photographing.

BACKGROUND ART

A technique of photographing a plurality of images having different orientations using a digital camera to generate a panoramic image having a wider field of view than one image by image processing of combining the image data of the plurality of images is known. Various methods of utilizing such panoramic image are known such as expressing the views of the interior or the surrounding of an object in an easy-to-understand manner as an advertisement of a real estate and showing an exhibition of visually reproducing the space of a museum rather than showing just a bird's-eye view image as in the related art.

With the spread of high-performance terminals such as smartphones having a digital photographing function, anyone can easily photograph an image and share the image on the Internet or the like, and a general demand for generating attractive contents is very high.

"360 Panorama" (see Non-Patent Literature 1) (product of Occipital Inc.) is an example of an application that provides a function of allowing users to photograph a panoramic image using a smartphone. With this application, it is possible to reproduce an image in an arbitrary direction from a photographing point by continuously photographing a number of images adjacent in vertical and horizontal directions using a digital photographing function and pasting the images to the inner surface of an imaginary sphere by image processing in a main body.

Such a simple panoramic image generation function is sufficient for enjoying as a hobby but has a problem in that the image quality is low for using as commercial advertisements or exhibitions in a museum. Thus, equipment in which a digital single-lens reflex camera having a wide-angle lens attached thereto and a special head are combined is generally used for such a purpose of photographing. For example, "Nodal Ninja 4" (see Non-Patent Literature 2) (product of Fanotec Corporation) is a head mounted on a tripod, capable of holding a digital single-lens reflex camera at an arbitrary angle and fixing the camera so that a nodal point of the lens corresponds to the center of rotation.

The following patent literatures disclose apparatuses for photographing panoramic images.

First, Patent Literature 1 proposes a panoramic photography camera in which a rotation jig of which the center of rotation is at a first principal point of a lens is arranged. The rotation jig is a technique of allowing users to photograph panoramic pictures easily, and a user rotates a camera body with his or her hands using the rotation jig to perform photographing sequentially. Patent Literature 1 discloses that a rotation angle is determined using a rotation angle meter or an orientation is determined using a stopper or the like that prevents a rotation of a camera from a set rotation angle.

The technique disclosed in Patent Literature 2 proposes that a nodal point of a principal lens is set to the position of a tripod attachment screw hole formed in a camera itself. Thus, a special jig for aligning the nodal point to the center of rotation is not required, and an accurate panoramic picture material with no parallax can be photographed using a panoramic head and a tripod.

The following patent literatures disclose conventional techniques related to a camera body.

Patent Literature 3 discloses a photographing device that secures accurate picture images in a series of frames covering 360 degrees to facilitate a stitching editing operation of stitching the picture images.

Moreover, Patent Literature 4 discloses a digital camera having a liquid crystal display and a level since it is important to maintain the vertical and horizontal directions of a camera body accurately during photographing a panoramic image. Patent Literature 5 discloses a level that is attached to a tripod.

Patent Literature 6 discloses an imaging device having a fisheye lens. Patent Literature 6 discloses an imaging device body having a fisheye lens that protrudes toward the front side. This device has mirrors disposed around the front side of the fisheye lens in order to simultaneously capture a plurality of images of surrounding areas used for distance measurement. A circular fish's-eye view image is obtained as the result of capturing.

CITATION LIST

Patent Literature

Patent Literature 1: Japanese Unexamined Patent Publication No. H05-188506
Patent Literature 2: Japanese Unexamined Patent Publication No. 2006-178097
Patent Literature 3: Japanese Unexamined Patent Publication No. 2004-101762
Patent Literature 4: Japanese Unexamined Patent Publication No. 2010-151915
Patent Literature 5: Japanese Unexamined Patent Publication No. H05-010496
Patent Literature 6: Japanese Unexamined Patent Publication No. 2010-276433

Non-Patent Literature

Non-Patent Literature 1: Internet URL (http://occipital.com/360/app) retrieved Mar. 9, 2013
Non-Patent Literature 2: Internet URL (http://shop.nodalninja.com/nodal-ninja-4-1/) retrieved Mar. 9, 2013

SUMMARY OF INVENTION

Technical Problem

In the conventional techniques, although a jig for rotating on a vertical line of the nodal point of a lens is proposed, the head used in a digital single-lens reflex camera has a complex structure and has a drawback in handling. Moreover, a head in which the position of a tripod attachment screw hole is on the vertical line of the nodal point is good for carrying. However, unless the head is placed on a tripod, it is difficult to photograph images while rotating and the usage thereof is limited.

Existing equipment for photographing panoramic images requires a large-scale device mentioned in the conventional technique and a camera in order to photograph high-precision images such as commercial pictures, and it is difficult for an ordinary person to easily photograph panoramic images. On the other hand, although it is possible to generate a panoramic image using a general digital camera, a smartphone having a camera function, or the like, the generated panoramic image has poor image quality, and it is only possible to photograph an image that a photographer enjoys personally.

In particular, when an ultrawide-angle lens having an angle of view larger than 180 degrees is used, the occurrence of vignetting in which a jig, a tripod, the body of a photographer, or the like are imaged is a great problem unless the shape of a camera or a photographing attitude is taken into consideration.

Thus, equipment that allows a user to easily photograph a high-quality panoramic image even when the user is not a professional photographer is required.

The present invention has been made in view of the problems of the conventional techniques and an object thereof is to provide a panoramic photography digital camera for easily photographing a plurality of images having different orientations without any vignetting in order to generate a panoramic image and to provide a photography system using the same.

Solution to Problem

In order to solve the problems, the present invention provides the following inventions.

That is, an invention is a panoramic photography digital camera for photographing a plurality of images which are used for generating a panoramic image and of which the orientations from a center of rotation are different, including: a wide-angle lens having an angle of view at least larger than 180 degrees; a camera body disposed closer to a rear side than the wide-angle lens and positioned at a position that does not fall within the angle of view; a digital imaging element included in the camera body; an image processor that processes image data obtained by the digital imaging element and outputs or stores the image data in a predetermined image format; a level for checking the level of the camera body; and a first connector for connection to a legged platform used when mounting the camera during photographing.

Moreover, the panoramic photography digital camera is characterized in that a nodal point of the wide-angle lens is positioned on the center of rotation, and the level provided on an upper surface of the camera body and the first connector provided on a lower surface of the camera body are disposed so as to be positioned on the same line that passes through the center of rotation when seen from above.

In the above-described panoramic photography digital camera, the digital imaging element has a rectangular shape of which one side has a first length and the other side is relatively long and has a second length, and the digital imaging element is disposed so that within a circular image incident from the wide-angle lens, an image that is shorter than a diameter of the circular image in the first length direction is incident on the digital imaging element and an image that is approximately the same as or larger than the diameter of the circular image in the second length direction is incident on the digital imaging element.

In the above-described, configuration, the angle of view of the wide-angle lens is 200 degrees or more, and an angle of view acquired by the digital imaging element in the first length direction is 180 degrees or more.

An invention is characterized in that the panoramic photography digital camera further includes a photography information generator that generates photography information related to a state of the panoramic photography digital camera during photographing, wherein the image processor records the photography information as an image in a non-image portion on an outer side of the circular image.

An invention is characterized in that the photography information is recorded as an image of a readable character symbol.

An invention is characterized in that the photography information is recorded as a barcode image.

An invention is characterized in that the photography information includes position and/or direction information during photographing.

An invention is characterized in that a grasping portion that a photographer grasps is displaced to a rear portion of the camera body up to a position that a finger does not fall within an angle of view in a state in which the grasping portion is grasped.

An invention is characterized in that the level is provided on an upper surface of a camera body, and an image display unit for monitoring a photographed image is provided on a side surface of the camera body.

An invention is characterized in that the panoramic photography digital camera has a moving image photography function.

The present invention can provide the following panoramic imaging systems.

That is, an invention is a panoramic photography system for photographing a plurality of images which are used for generating a panoramic image and of which the orientations from a center of rotation are different, including: a digital camera capable of photographing a digital image; and a legged platform on which a panoramic photography head for connection to a lower surface of a camera body is provided.

The digital camera includes: a wide-angle lens having an angle of view at least larger than 180 degrees; a camera body disposed closer to a rear side than the wide-angle lens and positioned at a position that does not fall within the angle of view; a digital imaging element included in the camera body; an image processor that processes image data obtained by the digital imaging element and outputs or stores the image data in a predetermined image format; a level for checking the level of the camera body; and a first connector for connection to a legged platform used when mounting the camera during photographing.

In this configuration, a panoramic photography system characterized in that the panoramic photography head is formed so that a center of rotation of the legged platform is positioned vertically below a nodal point of the wide-angle lens, and the level provided on an upper surface of the camera body is disposed so as to be positioned on the same line that passes through the center of rotation when seen from above can be provided.

Moreover, in the digital camera of the panoramic photography system, the digital imaging element has a rectangular shape of which one side has a first length and the other side is relatively long and has a second length, and the digital imaging element is disposed so that within a circular image incident from the wide-angle lens, an image that is shorter than a diameter of the circular image in the first length direction is incident on the digital imaging element and an image that is approximately the same as or larger than the diameter of the circular image in the second length direction is incident on the digital imaging element.

A panoramic photography system in which the angle of view in a horizontal direction of the wide-angle lens is 200 degrees or more, and an angle of view in a vertical direction, acquired by the digital imaging element in the first length direction is 180 degrees or more, and a panoramic image in all circumferential directions is generated from two captured images of which both ends overlap can be provided.

An invention is characterized in that the panoramic image in all circumferential directions is photographed as a moving image.

Advantageous Effects of Invention

With the above-described configurations, the present invention provides the following advantageous effects.

In the panoramic photography digital camera according to the present invention, the nodal point of the wide-angle lens is positioned on the center of rotation, and the level and the first connector for connection to the legged platform are disposed so as to be positioned on the same line that passes through the center of rotation when seen from above. Thus, it is possible to capture successive panoramic images appropriately without any special skill. In particular, since the nodal point is disposed on the center of rotation and the level is positioned on the same line, it is possible to align the horizontal and vertical directions appropriately.

Moreover, as a usage of digital imaging, the digital imaging element is disposed so that, within the circular image incident from the wide-angle lens, an image shorter than the diameter of the circular image in the first length direction is incident on the digital imaging element, and an image that is approximately the same as or larger than the diameter of the circular image in the second length direction is incident on the digital imaging element. Thus, it is possible to effectively utilize the length in the horizontal direction of a digital imaging element to capture an image incident from the wide-angle lens with high resolution.

In the wide-angle lens according to the present invention, when a circular fisheye image is incident, since photography information can be recorded in a portion which is conventionally black, it is possible to check the photography information simultaneously with browsing of images. Moreover, when the captured images are stored as image data, it is possible to save the photography information regardless of the saving format.

Further, since the photography information includes the position and the direction during photographing, processing which uses the information can be performed when generating panoramic images.

The panoramic photography digital camera includes the grasping portion displaced to the rear portion of the camera body up to the position that a finger or a photographer himself or herself does not fall within the angle of view in a state in which the grasping portion is grasped. Thus, the photographer can capture images with no vignetting without paying any special attention.

Further, when the level is disposed on the upper surface and the image display unit is disposed on the side surface, it is possible to allow a beginner photographer in particular to perform photographing while paying attention to the level only. Thus, it is possible to capture images while maintaining the vertical and horizontal directions naturally and to easily create a panoramic image from one photographed image.

Since the digital camera according to the present invention has a moving image photography panorama conversion function, it is possible to capture a panoramic moving image. Due to this, it is possible to see a moving image of an arbitrary direction while watching a panoramic moving image having a horizontal field of view of 200 degrees or more, for example. Moreover, a moving image made up of circular fisheye images having a field of view of 200 degrees or more may be recorded.

Further, a panoramic photography system in which the nodal point and the center of rotation are positioned on a vertical line using the panoramic photography head is provided. Thus, it is possible to easily set the nodal point on the center of rotation by assembling a digital camera and a legged platform and to capture a plurality of images used for generating a panoramic image.

DESCRIPTION OF EMBODIMENTS

Figure 1:
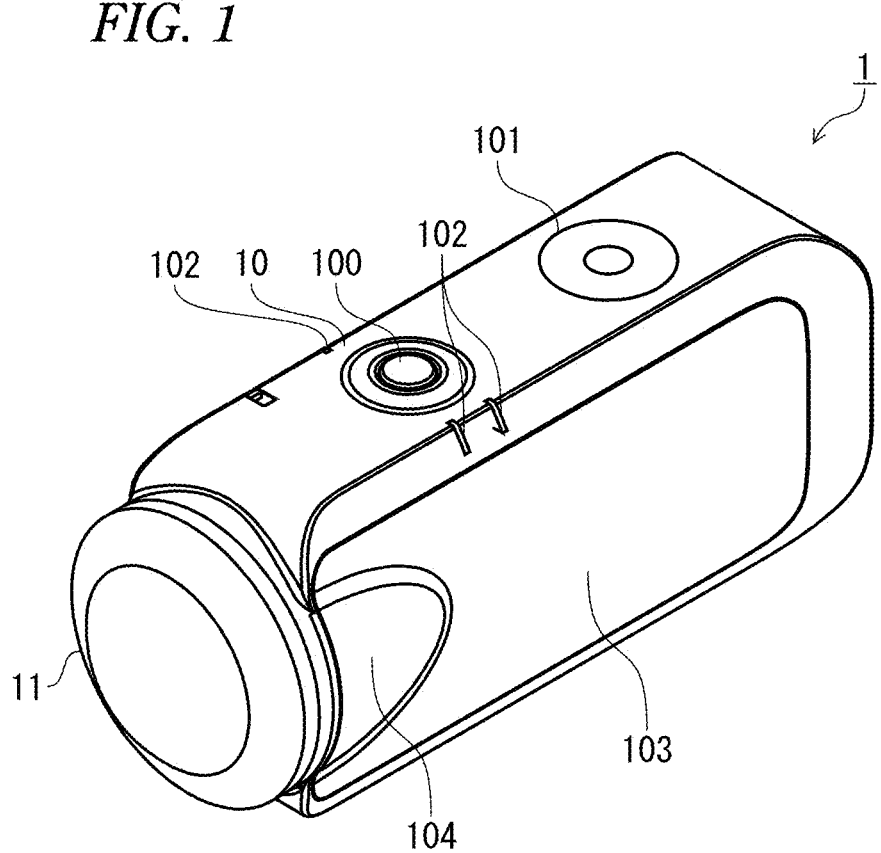
FIG. 1 is a perspective view of a panoramic photography digital camera according to the present invention.
Figure 2:
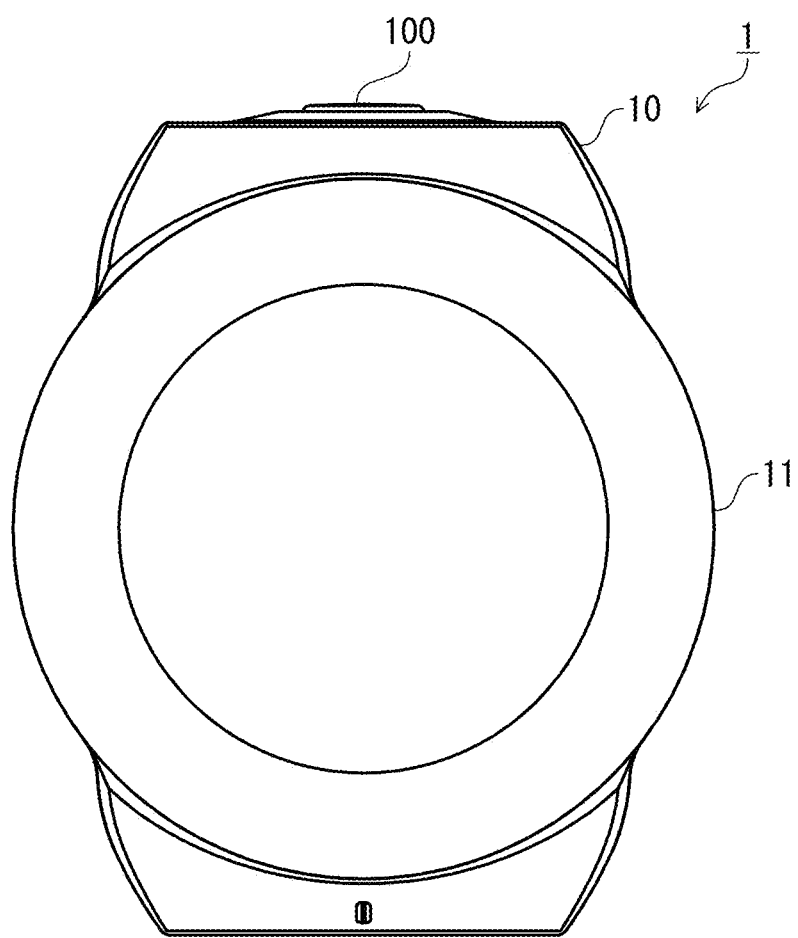
FIG. 2 is a left side view of the panoramic photography digital camera.
Figure 3:
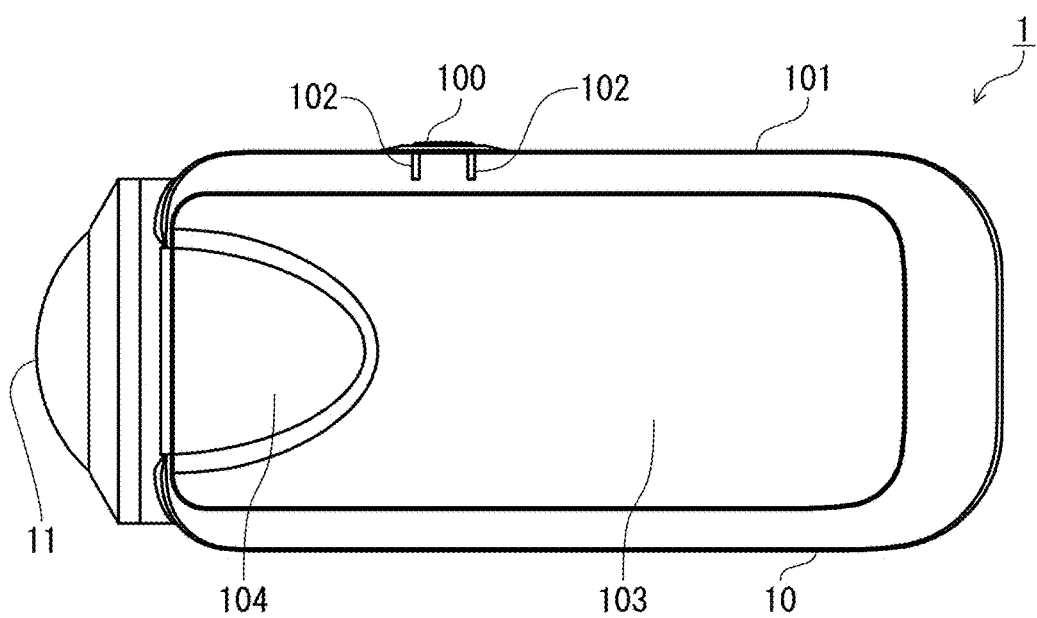
FIG. 3 is a front view of the panoramic photography digital camera.
Figure 4:
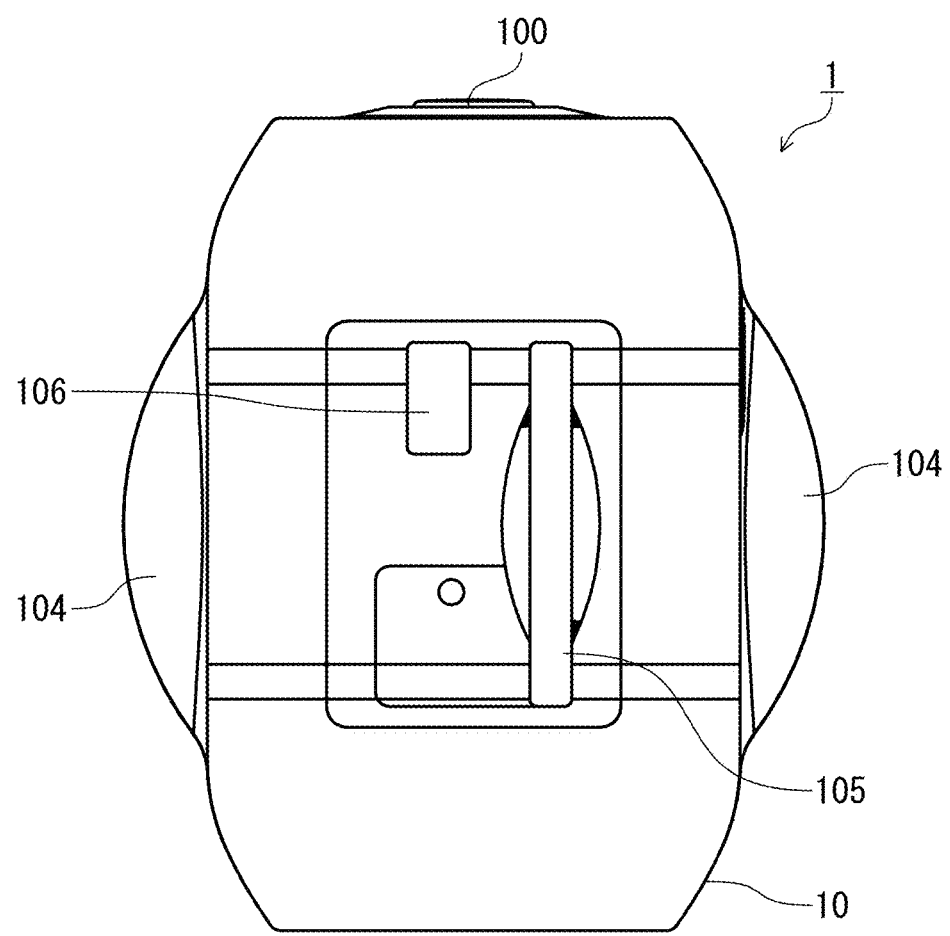
FIG. 4 is a right side view of the panoramic photography digital camera.
Figure 5:
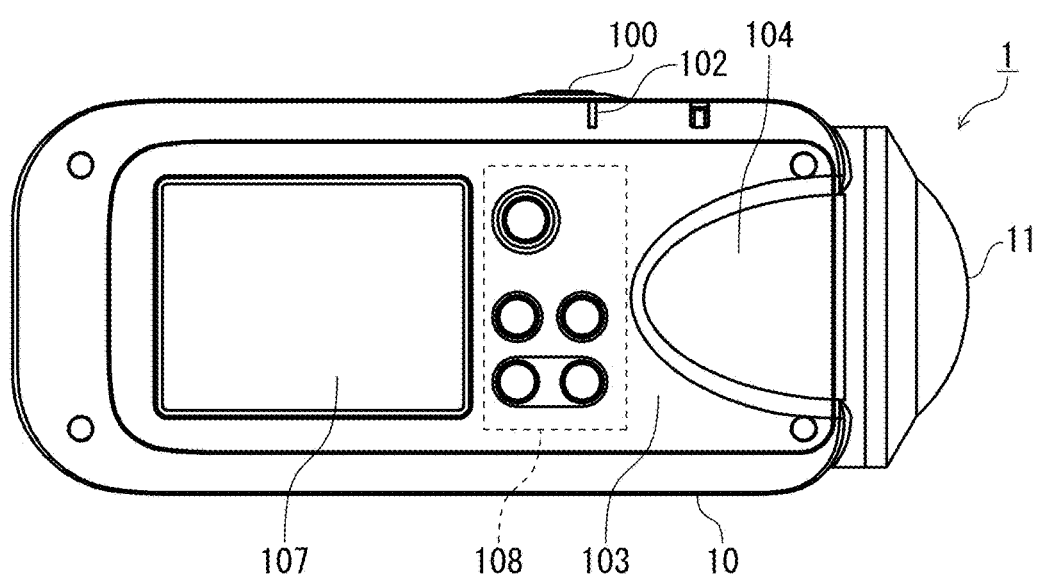
FIG. 5 is a rear view of the panoramic photography digital camera.

Hereinafter, an embodiment of the present invention will be described based on practical examples illustrated in the drawings. The embodiment is not limited to the below.

Figure 6A:
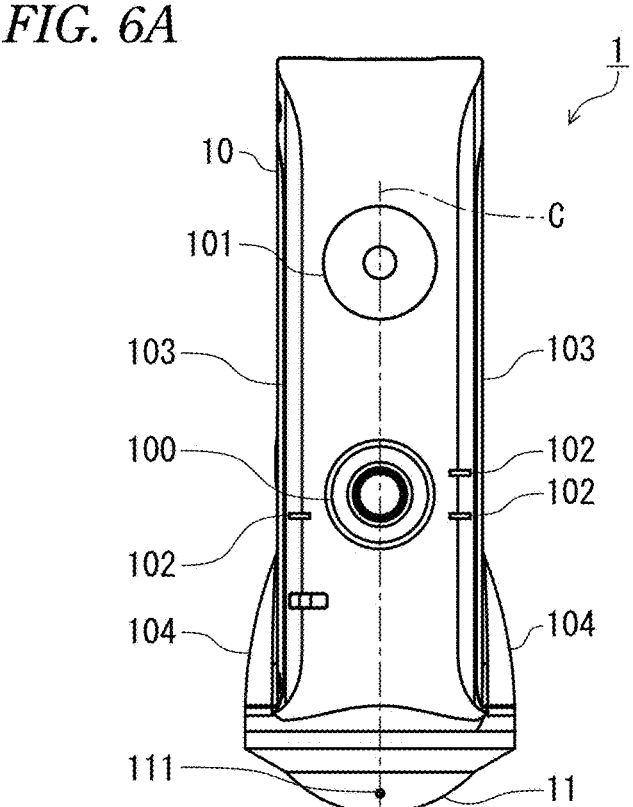
FIGS. 6A and 6B are a plan view and a bottom view of the panoramic photography digital camera, respectively.
Figure 6B:
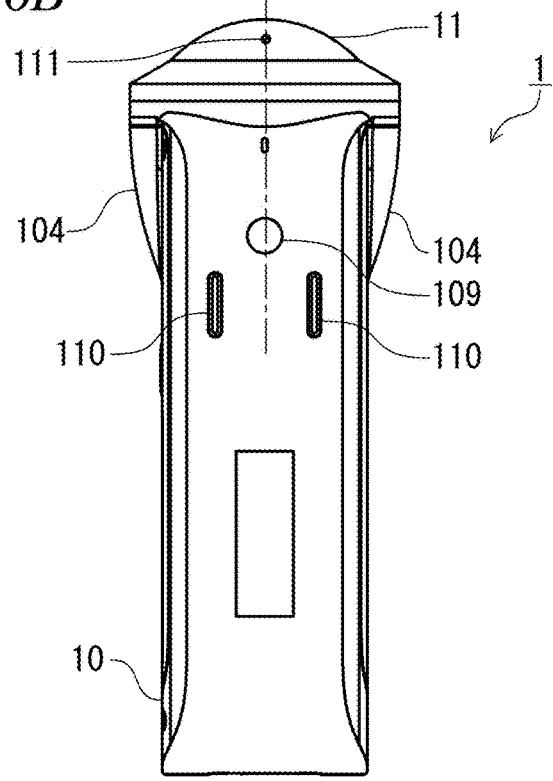

FIG. 1 is a perspective view of a panoramic photography digital camera 1 according to the present invention. Moreover, FIGS. 2 to 5 are a left side view, a front view, a right side view, and a bottom view, respectively, and FIGS. 6A and 6B illustrate a plan view and a bottom view, respectively.

The digital camera 1 includes a wide-angle lens 11 having an angle of view larger than 200 degrees (in the present practical example, 220 degrees) and a camera body 10 disposed closer to a rear side than the wide-angle lens 11 at a position that does not fall within the angle of view. The camera body 10 includes a digital imaging element (not illustrated) and an image processing circuit that processes image data obtained by the digital imaging element and outputs or stores the image data in a predetermined image format. Moreover, an image processing circuit capable of converting the image data directly to a panorama may store the converted data as a predetermined file or in a predetermined file format.

Such a digital imaging element is a well-known element such as a CCD image sensor or a CMOS image sensor, and in the present invention, the type of the element is not particularly limited. Moreover, the image processing circuit is also incorporated in existing digital cameras, smartphones, and the like, and an existing technique can be appropriately used.

A shutter button 100 for issuing a capture command and a level 101 for measuring an inclination of the camera body 10 with the aid of an air bubble are provided on an upper surface of the camera body 10. Moreover, an electronic level which uses a liquid crystal may be used instead.

LEDs 102 are formed on an upper surface of the shutter button 100 so as to indicate an ON/OFF state of power and an operation state of electronic devices included in the camera such as a GPS, an electronic compass, or a motion sensor.

The wide-angle lens 11 having an angle of view of 220 degrees is disposed on a front surface of the digital camera 1. When such a lens having the angle of view on the front side when seen from a photographer is used, if the photographer holds the camera like a conventional camera, the finger of the photographer may be imaged.

Thus, in the present invention, a grasping portion 103 is displaced to a rear portion of the camera body 10 up to a position that the finger does not fall within the angle of view in a state in which the grasping portion 103 is grasped. A vignetting preventing bump 104 that bulges toward the wide-angle lens 11 is formed on the front side of the grasping portion 103. When the finger of a photographer is caught at the vignetting preventing bump 104, the photographer may feel a sense of strangeness. Thus, the photographer can naturally grasp the correct position of the grasping portion 103.

A slot 105 for a memory card for storing photographed image data, a USB port 106 used for connection to a PC and charging, and the like are provided on the right side surface (see FIG. 4) of the camera body 10.

Further, a liquid crystal monitor 107 which is an image display unit for monitoring photographed images and operation buttons 108 for operating various functions of the camera are disposed on the rear surface (see FIG. 5) of the camera body 10.

In the present invention, the level 101 is provided on the upper surface of the camera body 10 and the liquid crystal monitor 107 is provided on the side surface so that the photographer can concentrate on adjustment of the level 101.

Since the liquid crystal monitor 107 is disposed in this manner, it is convenient for monitoring photographed images and changing the operations and settings of the camera.

Since the camera according to the present invention photographs all images on the front side of the camera, if it is not necessary to monitor the images and change the settings and the like, the liquid crystal monitor may not be provided.

An attachment screw hole 109 for connection to a monopod or a tripod is formed in a lower surface of the camera body 10 and forms a first connector of the present invention. Although the attachment screw hole 109 is provided in many camera bodies 10, in the present invention, a positional relation between the attachment screw hole 109 and the nodal point 111 of the wide-angle lens 11 is an important factor.

That is, the nodal point 111 of the wide-angle lens 11 is positioned on the center of rotation when an image of a different orientation in relation to the attachment screw hole 109 is photographed. This will be described later together with a configuration of a legged platform.

In the present invention, the level 101 and the attachment screw hole 109 are disposed on a straight line C that passes through the nodal point 111 when seen from above the camera. Since the nodal point is disposed on the center of rotation and the level is disposed on the same line, it is possible to align the vertical and horizontal directions.

Here, the wide-angle lens 11 and the digital imaging element of the digital camera 1 will be described in detail.

The wide-angle lens 11 of the present practical example is an ultrawide-angle lens having an angle of view of 220 degrees. Conventionally, although a fisheye lens having a horizontal field of view larger than 180 degrees is practically used as a surveillance camera or the like, cameras used for panoramic photography often have a horizontal field of view of approximately 180 degrees due to a general camera structure.

In recent years, with development of technologies, although techniques for increasing the angle of view and the image quality have been developed, a digital camera that captures panoramic photography images with an angle of view of 220 degrees or more is not known.

Figure 7:
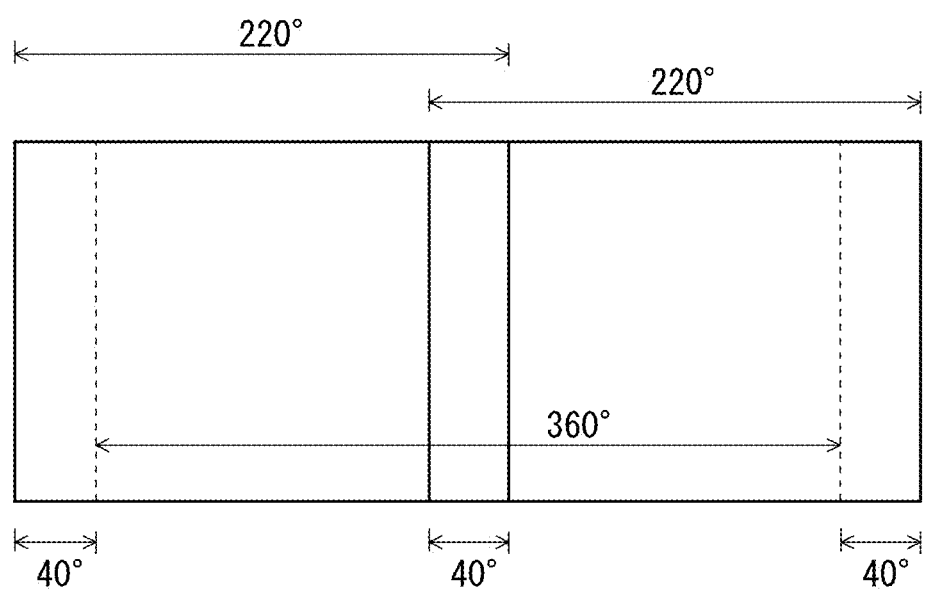
FIG. 7 is a diagram for explaining how a panoramic image of an entire circumference is generated from images with an angle of view of 220 degrees.

In the present practical example, a photographing method as illustrated in FIG. 7 is enabled with an angle of view of 220 degrees. As illustrated in the drawing, when two images of the opposite orientations are captured with an angle of view of 220 degrees, it is possible to obtain a 360-degree panoramic image of an entire circumference with an overlap of 40 degrees.

As widely known, when a panoramic image is generated, a match between the overlapping portions is detected and a plurality of images are combined. In this case, the more the overlaps, the more exactly the images can be combined.

Moreover, if a panoramic image can be generated from two images, by detecting the center using the level 101 when photographing images before and after the nodal point 111, a more accurate nodal point can be detected. When an accurate nodal point is used as a reference, it is possible to minimize a problem that a legged platform is unexpectedly photographed in respective images and to suppress the need of correction during image processing.

When a panoramic image of an entire circumference is generated using a lens having an angle of view of 180 degrees, since no overlap is formed in two images, it is necessary to combine at least three images (of three orientations). If many images are used, an error in orientation is likely to occur unless a head is used, and difficulties resulting from superimposition of images during combination, the hue, and the circumferential difference also increase.

Thus, it can be said that a large angle of view contributes to the easiness of generating a panoramic image and high quality.

On the other hand, when a lens having an angle of view of 200 degrees or more is used, effective use of a digital imaging element is an issue. In general, since digital imaging elements are generally rectangular, when an image having an angle of view of 200 degrees or more in the vertical direction is incident as in FIG. 8, the dark area near a circular fisheye image increases. Thus, a large number of pixels of a digital imaging element are not used, and the number of pixels used for an actual image portion decreases.

In particular, even when an image having an angle of view of 200 degrees or more in the vertical direction is acquired, since a legged platform or the like is photographed in a lower portion of the image and is often trimmed, such an image is generally meaningless in a panoramic image.

Figure 9:
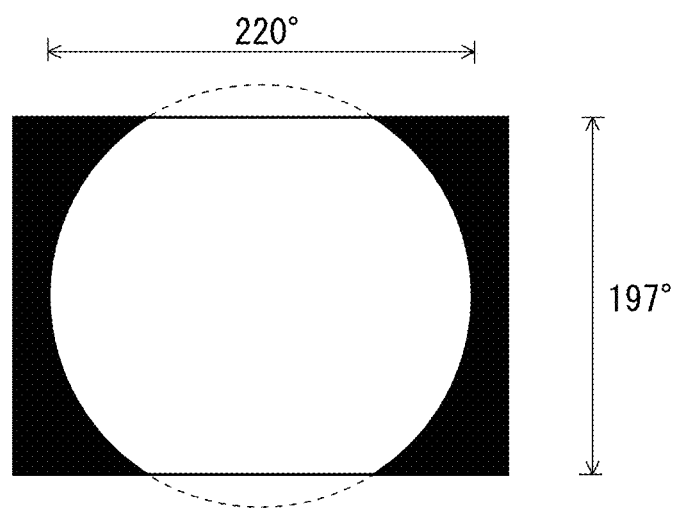
FIG. 9 is a diagram for explaining an image incident on a digital imaging element according to the present invention.

Thus, in the present invention, as illustrated in FIG. 9, an image having a length in a vertical direction shorter than the diameter of the circle of a circular fisheye image is incident on a digital imaging element having a relatively short vertical direction (first length) and a relatively long horizontal direction (second length) and an image having a length in a horizontal direction approximately equal to or larger than the diameter of the circle is incident on the digital imaging element. In the illustrated example, an entire image corresponding to an angle of view of 220 degrees is incident in the horizontal direction, whereas an image corresponding to an angle of view of 197 degrees is incident in the vertical direction.

The reason why an image corresponding to the angle of view of 197 degrees is incident in the vertical direction is to form overlaps between images by setting back an upper-side image when combining images to generate a panoramic image. Thus, a margin of approximately 2 degrees to 3 degrees may be provided as long as a photographer can photograph images accurately. In this case, an image may be photographed at the position of 185 degrees and a larger sensor area can be used effectively.

Figure 8:
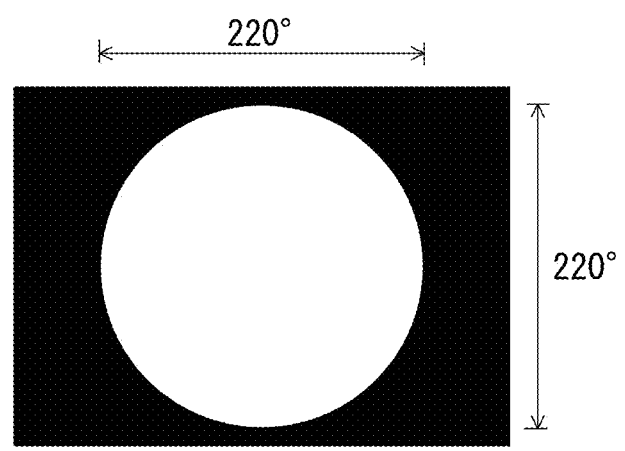
FIG. 8 is a diagram for explaining an image incident on a general digital imaging element.

According to this configuration, as obvious from comparison with FIG. 8, it is possible to use the digital imaging element without waste and to contribute to high quality of the photographed images. Since the entire image in the horizontal field of view of the wide-angle lens 11 is incident, it is possible to sufficiently form the overlapping portion when generating a panoramic image.

In the present invention, since an image that is shorter than the diameter of the circle in the first length direction is incident, although how much angle will be incident is arbitrary, the vertical field of view needs to be 180 degrees or more in order to acquire the images in all vertical directions.

According to such a usage, the angle of view of the wide-angle lens 11 is particularly preferably 200 degrees or more.

Further, the present invention provides a method of utilizing the dark area around a circular fisheye image.

The digital camera 1 includes a photography information generator that generates photography information related to the state during photographing. Since this generator is well known as a generator that generates photography information recorded in the Exif format of image data having the jpeg format, for example, in general digital cameras.

Figure 10:
FIG. 10 illustrates a practical example in which photography information is recorded in a dark area near a circular fisheye image.

The generated photography information is recorded in a non-image area (dark area) as illustrated in FIG. 10.

Examples of the photography information include a position 120 measured by a GPS or the like, a direction 121 acquired by an electronic compass, and a photographed date 122.

The photography information may be recorded as a readable character or symbol and may be recorded as a barcode image or the like.

When the photography information is recorded as a readable character symbol, the photography information can be seen simultaneously when a captured image is browsed. In particular, it is sometimes difficult to understand the content of a circular fisheye image depending on a subject. Thus, when the photography information is recorded in a non-image portion, it is possible to improve the convenience when generating and browsing panoramic image.

Moreover, since it is not necessary to extract information like Exif information, it is possible to easily check the photography information using a browse application corresponding to an image format.

When the photography information is recorded as a barcode or the like, the photography information can be ideally acquired automatically. That is, when information is recorded in an image, since the information is not text data, the information needs to be acquired using optical character recognition (OCR) when the photography information is used for automated processing of a computer. When the photography information is recorded as a barcode or the like, the computer an easily read the information.

Either 2-dimensional or 3-dimensional barcode may be use as the barcode. When a 3-dimensional barcode (for example, a QR code (registered trademark)) is used, a large amount of data can be recorded in a small space.

In addition to the above, examples of data stored as the photography information include a manufacturer/model name of a photographing apparatus, a resource of an entire image, a unit resource in horizontal and vertical directions, a shutter speed, an aperture (F-value), ISO sensitivity, a metering mode, flash, a exposure correction step, a focal length, a color space, and a thumbnail image.

The photography information may further include motion information. A motion sensor may be included so as to detect an inclination during photographing of the digital camera 1 to acquire motion information, and the acquired motion information may be recorded and used when generating a panoramic image. The motion information when combined with the direction information contributes to high precision of image combination.

Since a plurality of images are combined and used for photographing panoramic images, the photography information recorded in the above-described manner can be effectively utilized when generating panoramic images. For example, images used for generating a group of images of different directions 121 can be extracted from images photographed at the same position 120. The direction information 121 can be further used for detecting an overlapping range in the process of combining images. For example, although it is difficult to detect an overlap when the overlapping portion is a solid image of a single color, it is possible to generate high-precision panoramic images using this method.

The digital camera according to the present invention may have a moving image photography function. Since a moving image photography function of a digital camera is an existing technique, the description thereof will not be provided. By using such an ultrawide-angle lens as in the present practical example, it is possible to easily acquire a panoramic moving image in all circumferential directions by mounting the lens so as to face right below or vertically upward.

In the photographed panoramic moving image, since a moving image of an arbitrary direction can be seen with the lapse of time using the function of browsing software, it is possible to provide the panoramic moving image as a realistic image in an environment with motions.

The photography information according to the present invention is useful when generating panoramic moving images. In particular, it is possible to correct the inclination and the direction of a moving image based on position information obtained by a GPS, direction information obtained by an electronic compass, and motion information obtained by a motion sensor and to generate a stable moving image.

(Another Practical Example)

Figure 11:
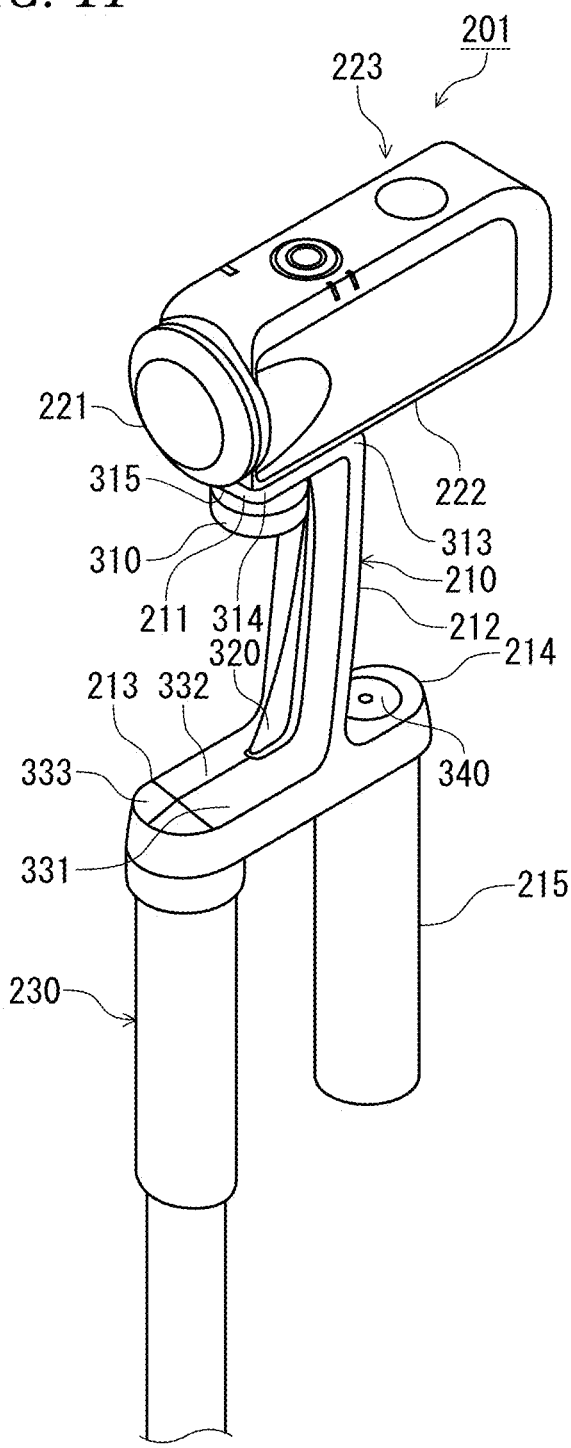
FIG. 11 is a perspective view of a panoramic photography system according to the present invention.
Figure 12:
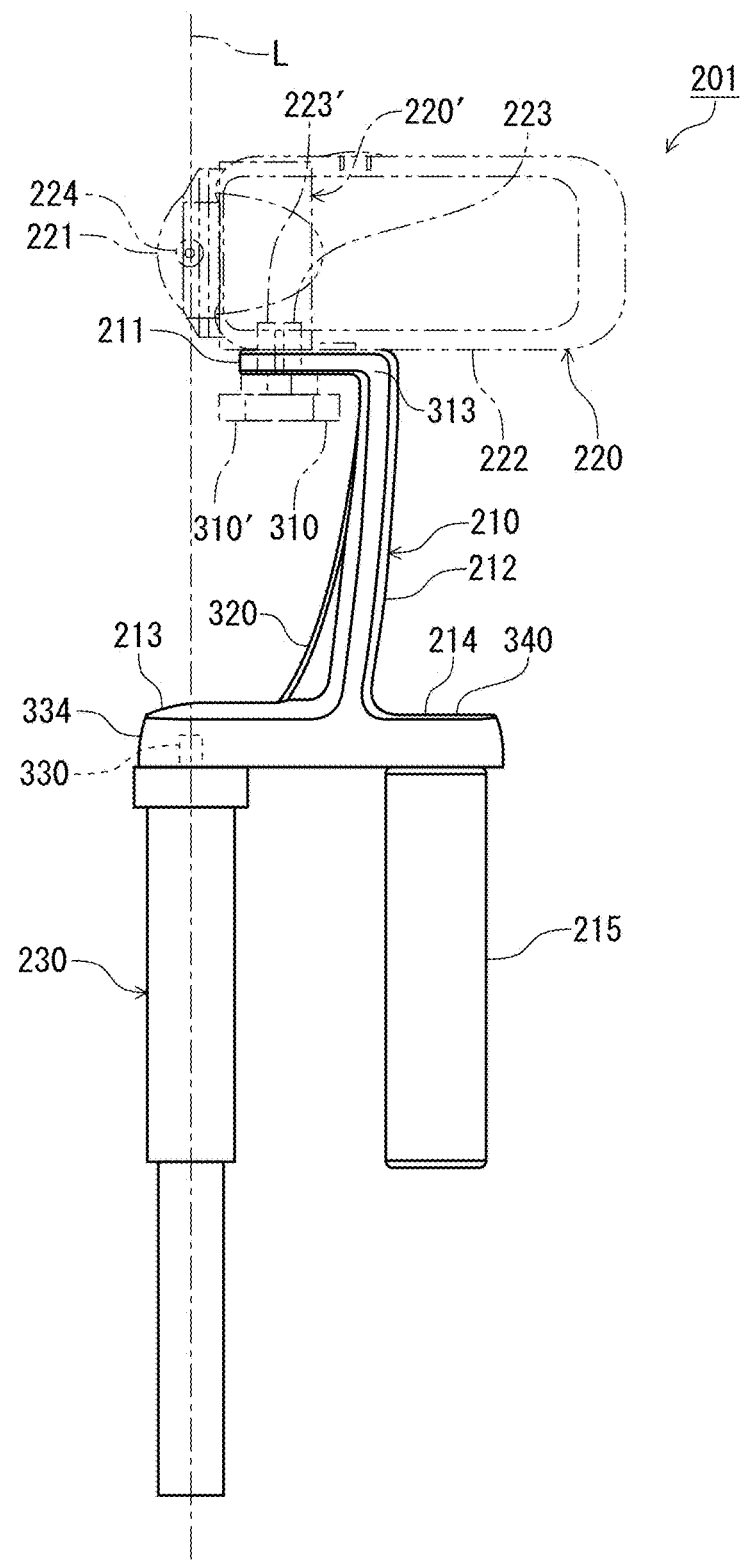
FIG. 12 is a front view of the panoramic photography system.

Next, a panoramic photography system (hereinafter referred to as the present system) according to the present invention will be described. FIG. 11 is a perspective view illustrating a portion of the present system 201 and FIG. 12 is a front view of the present system.

The present system includes a head 210, a digital camera body 220 having an ultrawide-angle lens 221 having a predetermined field of view (in particular, an angle of view larger than 180 degrees) at a front end, and a monopod 230 connected to a lower surface of the head 210.

Since the configuration of the monopod 230 is known, the description thereof will not be provided in the present practical example.

An attachment screw hole 223 for connection to a monopod or a tripod is formed in the lower surface of the digital camera body 220 and forms a first connector of the present invention.

The digital camera body 220 is disposed on an upper surface of an upper plate 211 of the head 210 and is fixed by an attachment screw 310 which is a second connector. Linear projections are formed on both sides of the attachment screw 310 like projections 110 formed on both sides of the attachment screw hole 109 of FIG. 6B. The projections engage with recesses (not illustrated) formed in the lower surface of the digital camera body 220. In this way, the head 210 and the digital camera body 220 are maintained in a fixed directional relation.

In the panoramic photography system, if both head and body are rotated unexpectedly, it is not possible to photograph images in a correct direction, and to obtain images having a required angle of view. Thus, it is important to connect the two components so as not to be rotatable by engaging the projection and the recess of the first and second connectors.

The upper plate 211 extends horizontally toward the rear side of the camera and is bent downward at the rear end thereof. A vignetting preventing extension 212 extends from the bent portion 313 so as to be slightly inclined toward the front side.

With this inclination, when a photographer grasps the vignetting preventing extension 212, it is easy to provide the digital camera body 220 on the upper side and to perform photographing with no fear of being photographed as long as the vignetting preventing extension is grasped.

In this manner, in the present invention, the vignetting preventing extension 212 may ideally perform the function of a grip portion.

The vignetting preventing extension 212 secures a predetermined gap between the upper plate 211 and a lower plate 213 connected to the lower end thereof to prevent the lower plate 213 or the monopod 230 from being photographed in a panoramic image.

Figure 13:
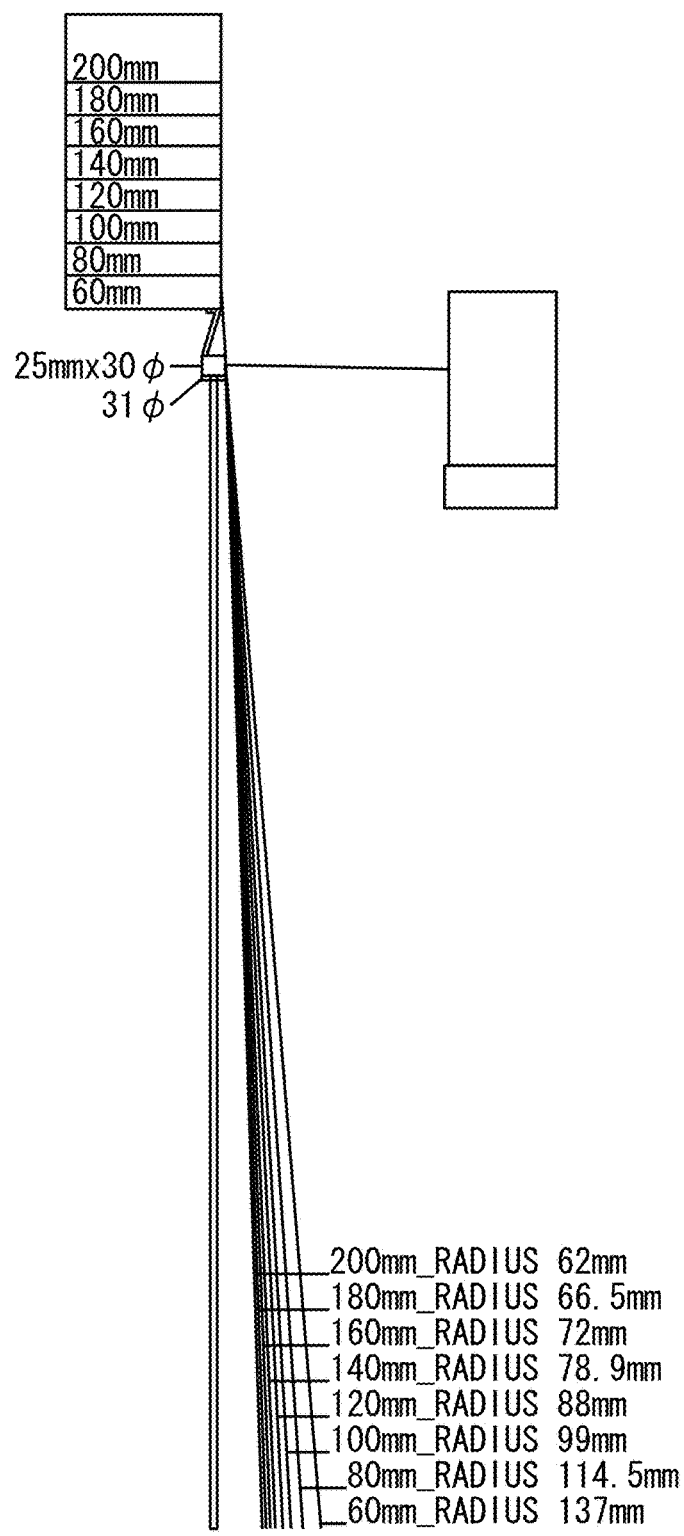
FIG. 13 illustrates a test example of determining the length of a vignetting preventing extension according to the present invention.

FIG. 13 illustrates a test example of examining a photographed range when the head according to the present invention, a monopod, and a digital camera body having an angle of view of 180 degrees. When the length between an upper end of a monopod and an upper end of a head is 60 mm, a connecting portion having a diameter of 31 mm between the monopod 230 and the lower plate 213 is photographed, and an area having a radius of 137 mm on a mounting surface becomes a vignette. On the other hand, when the length is 200 mm, the radius is 62 mm. This difference is remarkable when photographing a 360-degree panoramic image. In the present practical example, the length of the vignetting preventing extension 212 is set to approximately 13 cm based on this test.

In implementation of the present invention, although this length can be changed arbitrarily, the length is in the range of 60 mm to 200 mm from the test results. Moreover, when the vignetting preventing extension functions as a grip portion as described above, the length thereof is ideally approximately between 120 mm and 200 mm.

The vignetting preventing extension 212 is a plate having approximately the same width as the upper plate 211 and a reinforcement rib 320 extends from a lower portion to the lower plate 213 so as to protrude toward the front side. With this rib 320, the angle between the vignetting preventing extension 212 and the lower plate 213 is not misaligned, and images can be photographed in a stable orientation.

The rib 320 may not be formed in the vignetting preventing extension 212 depending on the strength.

The lower plate 213 is formed approximately horizontally from the lower end of the vignetting preventing extension 212 so as to extend toward the front side. In the present practical example, a support plate 214 is formed integrally with the lower plate 213 so as to extend toward the rear side further than the vignetting preventing extension 213.

A legged platform screw hole 330 as a legged platform connector for connection to the monopod is formed in a lower surface of the front end of the lower plate 213, and the lower surface is fixed by a legged platform screw that protrudes upward from the monopod 230. The legged platform connector and the legged platform preferably engage with each other so as not to be rotatable so that a universal head that is freely rotatable is not provided in the monopod.

It is the most important point of the present invention that in this connection state, the legged platform connector is positioned vertically under the nodal point 224 of the lens 221 provided in the digital camera body.

In the present practical example, since a monopod is used, the legged platform screw and the legged platform screw hole 330 are disposed on the central axis of the monopod, and the upper plate 211 and the lower plate 213 are disposed so that the nodal point is positioned on the extension line L of the central axis.

As widely known, since the camera photographs images while rotating about the nodal point 224, it is possible to generate high-quality panoramic images without any distortion.

Since the nodal point is different depending on the lens 221, it is necessary to determine the position of the attachment screw 310 for each digital camera or lens in implementation of the present invention. Thus, it is preferable to use the head 210 having a dedicated design. By doing so, users can use the head easily.

Alternatively, in order to cope with two types of cameras having lenses with different nodal points, for example, the attachment screw 310 may be selectively attached to two holes so that users select a hole to which the attachment screw is to be fixed depending on a camera.

The alternative example is depicted by one-dot chain line in FIG. 12, in which an attachment screw 310' displaced toward the front side from the original attachment screw 310 engages with a screw attachment hole 223' of another digital camera 220'.

As another practical example, the upper plate 211 may be detachable from the vignetting preventing extension 212 so that the upper plate 211 only can be replaced depending on a digital camera or a lens. In this case, since it is only necessary to replace the upper plate with another suitable for a camera or the like, it is possible to provide a resource-saving and low-cost head.

In the present practical example, the support plate 214 rotatably supports a grip 215. The grip 215 has a sponge-shaped non-slip coating on the surface thereof so that a photographer can grasp the grip 215 reliably.

The grip 215 may not rotate but may be fixed to the support plate.

A level 340 may be provided on an upper surface of the support plate 214. In panoramic photography, a camera needs to maintain an accurate horizontal position, and a camera, a tripod, and the like having a level have been proposed from the past.

However, it is generally difficult for photographers to take a stable photographing position while checking the level, which becomes the causes of a tilt or a shake of a camera when a monopod as in the present practical example is used.

In the present practical example, since the level is provided immediately above the grip 215, photographers can perform horizontal alignment immediately and perform photographing with high precision.

The level may be provided on the upper surface of the lower plate 213 or on the rear-side surface of the vignetting preventing extension 212.

In the present invention, since it is assumed that the ultrawide-angle lens 221 is used in the digital camera body 220, structures for preventing the entrance of reflection light immediately from below the lens 221 and the occurrence of vignetting are employed.

As a first structure, corner portions 314 and 315 of the upper plate 211 are formed in a square and round form. By doing so, the corner portions 314 and 315 are prevented from being photographed in an image and the entrance of reflection light from the upper surface of the corner portions 314 and 315 is prevented.

As a second structure, an upper surface of the lower plate 213 is inclined downward as the surface advances toward the outer side. As obvious from FIG. 1, mountain-side inclined portions 331 and 332 are provided on both left and right sides of a portion disposed closer to the front side than the connection portion between the vignetting preventing extension 212 and the lower plate, and an inclined portion 333 that is inclined toward the left, right, and front sides is provided in a front end of the lower plate.

By doing so, even when the sunlight or illumination light enters the lower plate from above, the reflection light is reflected toward the outer side and is prevented from entering the lens 221.

Similarly, in order to prevent reflection of light, the head is preferably coated with a low-reflective paint or subjected to anti-glare surface treatment, and a paint having a color such as black that rarely reflects light is preferably used.

REFERENCE SIGNS LIST

1: Panoramic photography digital camera
10: Camera body
11: Wide-angle lens
100: Shutter button
101: Level
102: LED
103: Grasping portion
104: Bump

The invention claimed is:

1. A panoramic photography digital camera for photographing a plurality of images which are used for generating a panoramic image and of which the orientations from a center of rotation are different, comprising:
a wide-angle lens having an angle of view at least larger than 200 degrees or more;
a camera body disposed closer to a rear side than the wide-angle lens and positioned at a position that does not fall within the angle of view;
a digital imaging element included in the camera body;
an image processor that processes image data obtained by the digital imaging element and outputs or stores the image data in a predetermined image format;
a level for checking the level of the camera body; and
a first connector for connection to a legged platform used when mounting the camera during photographing, wherein
a nodal point of the wide-angle lens is positioned on the center of rotation,
the level provided on an upper surface of the camera body and the first connector provided on a lower surface of the camera body are disposed so as to be positioned on the same line that passes through the center of rotation when seen from above,
the digital imaging element has a rectangular shape of which one side has a first length and the other side is relatively long and has a second length, and
the digital imaging element is disposed so that within a circular image incident from the wide-angle lens, an image that is shorter than a diameter of the circular image in the first length direction is incident on the digital imaging element and an image that is approximately the same as or larger than the diameter of the circular image in the second length direction is incident on the digital imaging element, and an angle of view acquired by the digital imaging element in the first length direction is 180 degrees or more.

2. The panoramic photography digital camera according to claim 1, further comprising:
a photographic information generator that generates photographic information related to a state of the panoramic photography digital camera during photographing, wherein
the image processor records the photographic information as an image in a non-image portion on an outer side of the circular image.

3. The panoramic photography digital camera according to claim 2, wherein
the photographic information is recorded as an image of a readable character symbol.

4. The panoramic photography digital camera according to claim 1, wherein
the photographic information is recorded as a barcode image.

5. The panoramic photography digital camera according to claim 4, wherein
the photographic information includes position and/or direction information during photographing.

6. The panoramic photography digital camera according to claim 1, wherein
a grasping portion that a photographer grasps is displaced to a rear portion of the camera body up to a position that a finger does not fall within an angle of view in a state in which the grasping portion is grasped.

7. The panoramic photography digital camera according to claim 1, wherein
the level is provided on an upper surface of a camera body, and
an image display unit for monitoring a photographed image is provided on a side surface of the camera body.

8. The panoramic photography digital camera according to claim 1, wherein
the panoramic photography digital camera has a moving image photography function.

9. A panoramic photography system for photographing a plurality of images which are used for generating a panoramic image and of which the orientations are different, comprising:
a digital camera capable of photographing a digital image; and
a legged platform on which a panoramic photography head for connection to a lower surface of a camera body is provided, the digital camera comprising:
a wide-angle lens having an angle of view at least larger than 200 degrees or more;
a camera body disposed closer to a rear side than the wide-angle lens and positioned at a position that does not fall within the angle of view;
a digital imaging element included in the camera body;
an image processor that processes image data obtained by the digital imaging element and outputs or stores the image data in a predetermined image format;
a level for checking the level of the camera body; and
a first connector for connection to a legged platform used when mounting the camera during photographing, wherein
the panoramic photography head is formed so that a center of rotation of the legged platform is positioned vertically below a nodal point of the wide-angle lens,
the level provided on an upper surface of the camera body is disposed so as to be positioned on the same line that passes through the center of rotation when seen from above,
the digital imaging element has a rectangular shape of which one side has a first length and the other side is relatively long and has a second length, and
the digital imaging element is disposed so that within a circular image incident from the wide-angle lens, an image that is shorter than a diameter of the circular image in the first length direction is incident on the digital imaging element and an image that is approximately the same as or larger than the diameter of the circular image in the second length direction is incident on the digital imaging element, an angle of view acquired by the digital imaging element in the first length direction is 180 degrees or more, and a panoramic image in all circumferential directions is generated from two captured images of which both ends overlap.

10. The panoramic photography system according to claim 9, wherein
the panoramic image in all circumferential directions is photographed as a moving image.

* * * * *